United States Patent [19]

Ziegler et al.

[11] Patent Number: 4,809,835
[45] Date of Patent: Mar. 7, 1989

[54] RELEASER SNAP CONNECTION FOR A PULLED-TYPE DIAPHRAGM SPRING CLUTCH

[75] Inventors: Erwin Ziegler, Gressthal; Peter Huditz, Stadtlauringen; Werner Fricke, Hassfurt; Helmuth Weissenberger, Waigolshausen, all of Fed. Rep. of Germany

[73] Assignee: Fichtel & Sachs AG, Schweinfurt, Fed. Rep. of Germany

[21] Appl. No.: 98,065

[22] Filed: Sep. 17, 1987

[30] Foreign Application Priority Data

Sep. 27, 1986 [DE] Fed. Rep. of Germany ....... 3632884

[51] Int. Cl.$^4$ .............................................. F16D 23/14
[52] U.S. Cl. ................... 192/89 B; 192/70.13; 192/98; 192/110 B; 192/DIG. 1
[58] Field of Search .................... 192/98, 89 B, 70.13, 192/110 B, DIG. 1

[56] References Cited

U.S. PATENT DOCUMENTS

| 4,658,945 | 4/1987 | Muller | 192/89 B |
| 4,667,800 | 5/1987 | Lassiaz et al. | 192/98 |
| 4,733,762 | 3/1988 | Gay et al. | 192/98 |
| 4,733,764 | 3/1988 | Corral et al. | 192/98 |

FOREIGN PATENT DOCUMENTS 7325080 10/1973 Fed. Rep. of Germany .
3415626 10/1984 Fed. Rep. of Germany .
2588051 4/1987 France ............................. 192/110 B Primary Examiner—Rodney H. Bonck
Attorney, Agent, or Firm—Toren, McGeady & Associates

[57] ABSTRACT

For the snap connection of a clutch releaser with spring tongue ends of a diaphragm spring in a pulled-type diaphragm spring clutch, there is secured to the spring tongue ends a first ring part which comprises a radially inwardly protruding first stop ring shoulder directed axially away from the releaser. With the releaser there is connected a second ring part which comprises a radially outwardly protruding second stop ring shoulder directed axially to the releaser and is insertable, with the second stop ring shoulder leading, through beneath the first stop ring shoulder axially into the first ring part. On the side of the first ring shoulder axially remote from the releaser a radially elastic wire ring is arranged which snaps over the second ring shoulder in the insertion of the second ring part. A support ring is axially fixedly inserted into the first ring part and axially supports the wire ring on a ring shoulder in the insertion of the second ring part. The support ring is held by retaining tabs on the first ring part, each of which comprises at least one spring tongue which rests from radially outwards on the wire ring and centers the wire ring for the insertion of the second ring part.

11 Claims, 5 Drawing Sheets

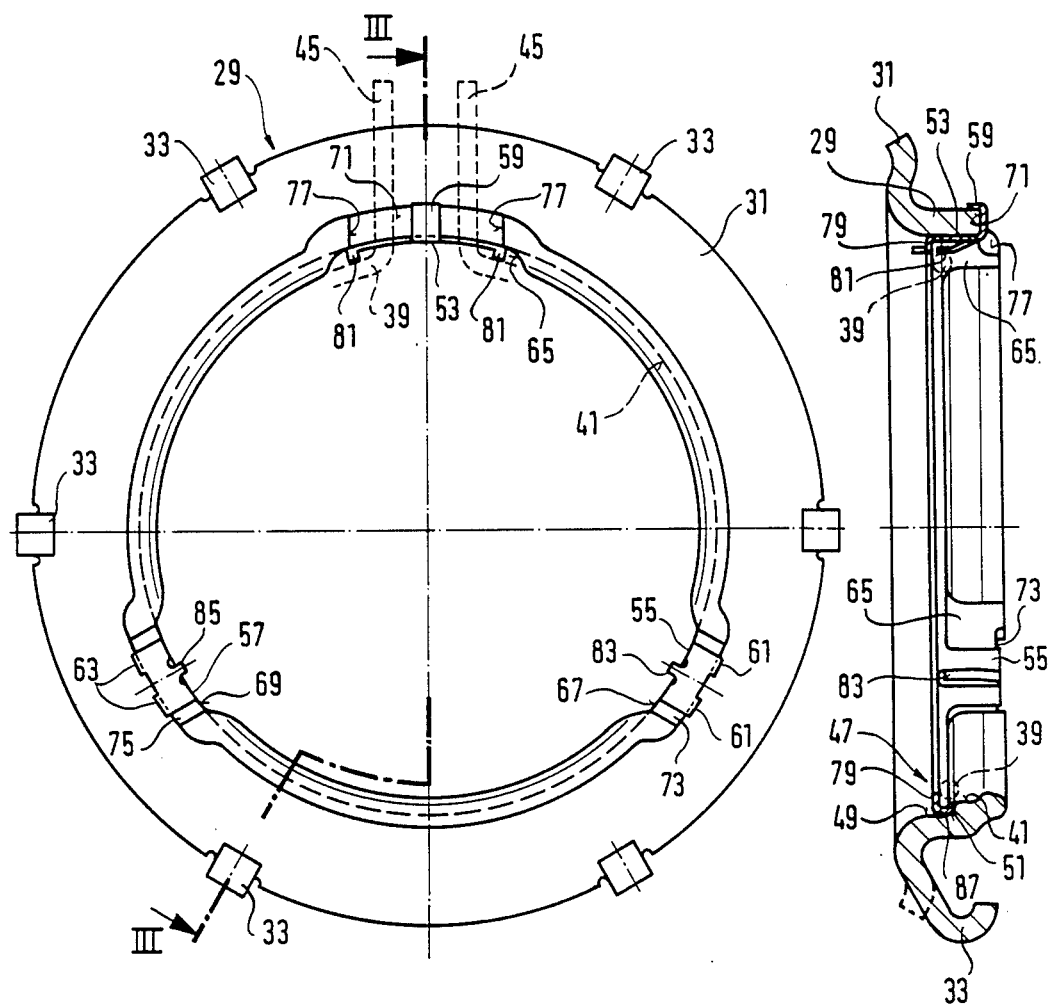

RELEASER SNAP CONNECTION FOR A PULLED-TYPE DIAPHRAGM SPRING CLUTCH

BACKGROUND OF THE INVENTION

The invention relates to an arrangement for the snap connection of a clutch releaser with spring tongue ends of a diaphragm spring in a diaphragm spring clutch of the pulled construction type.

Motor vehicle friction clutches are ordinarily pre-fitted on the engine, while the pertinent clutch releaser is first combined into one unit with the gear. In the case of pulled-type diaphragm spring clutches, in the assembling of engine and gear the releaser must be connected with the spring tongue ends of the diaphragm spring. This connection normally can be produced only with comparative difficulty, since the clutch and the releaser are covered by a bell of the gear box.

It is known from German Patent application No. DE-A-3,415,626 and from German Utility Model No. DE-U-7,325,080 to connect the clutch releaser with the spring tongue ends of the diaphragm spring of the clutch by means of a snap connection in the assembling of engine and gear. The snap connection includes two ring parts, of which a first ring part is secured to the ends of the spring tongues and comprises a radially inwardly protruding first ring stop shoulder directed axially away from the releaser, and a second ring part, which is a component of the releaser, has a radially outwardly protruding second ring stop shoulder directed axially toward the releaser. In the uniting of engine and gear the second ring part is pushed into the first ring part and snaps into the first ring part with the aid of a radially elastic annular component which spreads out in between the two stop ring shoulders.

In the snap connection known from DE-A-3,415,626 the expandable ring part is made as a wire ring which is seated in a ring groove of the second ring part allocated to the releaser and in the bringing together of the two ring parts is forced into the groove until it can snap in behind the stop ring shoulder of the first ring part. The first ring part, connected with the diaphragm spring, has a comparatively complicated form, since further ring shoulders, by means of which the wire ring can be released from the snap connection in dismantlement, must be provided behind the first ring stop shoulder. Entry tapers are provided on the mutually axially facing sides of the two ring parts, and are intended to facilitate the fitting together of the ring parts. Admittedly fitting together is made more difficult by the fact that the wire ring lies freely movably in the groove of the second ring part and before the uniting of the two ring parts lies with its lower half substantially completely out of the groove, by reason of the dimensions necessary for the snap connection, before it is centered and forced into the groove by the entry ramp of the first ring part. This involves the danger that the wire ring may be forced entirely out of the groove by reason of its radially elastic properties, that is to say the snap connection is not effected at all.

In the snap connection according to DE-U-7,325,080 the radially expandable component is made as a sleeve provided with radially resilient tongues. In the case of this snap connection the fitting together of the two ring parts is comparatively difficult by reason of close tolerances, and for the dismantlement an additional wire ring is necessary which surrounds the spring tongues of the sleeve. The wire ring is axially movable in relation to a taper and is capable of pivoting the spring tongues of the sleeve out of engagement.

The invention is directed to facilitate the fitting of the releaser on the spring tongue ends of a pulled-type diaphragm spring clutch with low constructional expense. At the same time it is to be ensured that the snap connection used for this purpose is durable, but is easy to disengage in dismantlement.

SUMMARY OF THE INVENTION

Within the scope of the invention again two ring parts provided with ring stop shoulders are provided on the spring tongue ends of the diaphragm spring and on the releaser. In the assembly the ring parts are radially guided by an additional support ring. The support ring is seated in a first of the two ring parts held on the diaphragm spring and likewise has a ring shoulder against which the wire ring is placed in the insertion of the second ring part provided on the releaser. The support ring is held on the first ring part by retaining tabs which extend radially outside the wire ring and each carry spring tongues which center the wire ring from radially outside. The second ring part therefore can be threaded more easily into the first ring part and especially into the wire ring, in the assembling of engine and gear.

The support ring is preferably a one-piece sheet metal shaped part on which the retaining tabs and spring tongues are formed. The wire ring is preferably made as a wire ring which is of circular ring form throughout, but open, the ring ends of which are bent off outwards, so that when the snap connection is closed they are accessible for dismantlement. By reason of the configuration of the loaded zones of the wire ring with continuous circular ring form, that is smooth, the wire ring is uniformly loaded, which leads to a comparatively long life of the snap connection.

The bent-off ring ends of the wire ring expediently emerge in the region of a retaining tab through an axial aperture of the first ring part. This retaining tab is preferably provided with two spring tongues which hold the wire ring in the region of both ring ends, in order thus to be better able to center the open part of the wire ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 2 shows an axial elevation of a ring part for securing on the diaphragm spring of the thrust plate unit;

FIG. 3 shows a sectional view through the ring part, seen along a line III—III in FIG. 2;

DETAIL DESCRIPTION OF THE DRAWINGS

Figure 1:
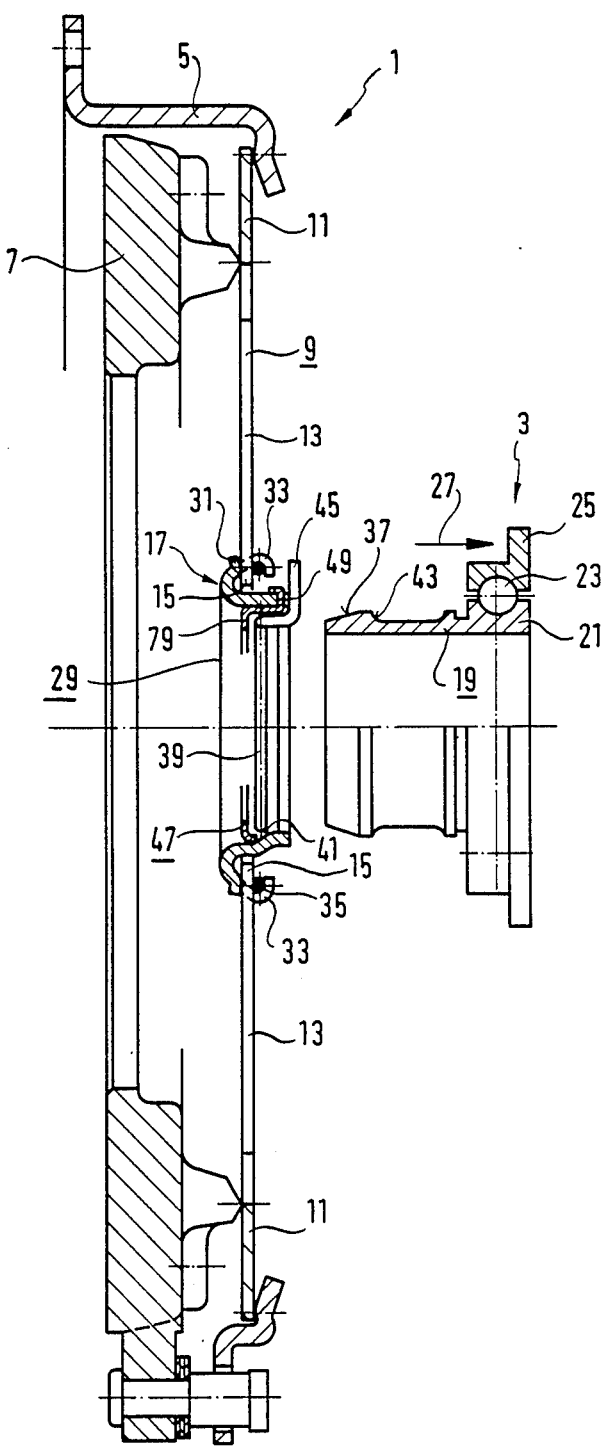
FIG. 1 shows an axial longitudinal section through a thrust plate unit of a pulled-type diaphragm spring clutch and a pertinent releaser, before assembly.

FIG. 1 shows a thrust plate unit 1 of a pulled-type diaphragm spring friction clutch for a motor vehicle and a releaser 3 in a position before assembly of engine and gear. The thrust plate unit 1 includes a clutch cover 5 for securing in the usual way to the fly-wheel of the engine. The clutch cover 5 encloses a presser plate 7 which is guided non-rotatably but axially displaceably in relation to the clutch cover 5. Between the clutch cover 5 and the presser plate 7 a diaphragm spring 9 is braced which bears with the external circumference of its annular disc part 11 on the clutch cover 5 and with the internal circumference of its annular disc part 11 on the presser plate 7. Spring tongues 13 separated from one another by slots protrude radially inwards from the internal circumference of the annular disc part 11, on the radially inner, free ends 15 of which tongues a first ring part 17 is secured. The ring part 17, explained in greater detail hereinafter, renders possible a snap connection with a second ring part 19, formed as sleeve, of the releaser 3. The ring part 19 forms a unit with a rotating bearing race ring 21 of a releaser ball bearing 23, the non-rotating bearing race ring 25 of which cooperates with a release fork or the like (not further illustrated) of the release system of the motor vehicle. When the ring parts 17, 19 are connected with one another the releaser 3 transmits a traction force in the direction of an arrow 27 by way of the ring part 17 to the ends 15 of the spring tongues 13. Thus the presser plate 7 is relieved of the force of the diaphragm spring 9, whereby the clutch is disengaged.

The ring part 17 comprises a sleeve part 29 bent from sheet metal which passes through the central opening of the diaphragm spring 9 formed by the ends 15 of the spring tongues 13 and has, on the side axially remote from the releaser 3, a ring shoulder 31 resting on the ends 15 of the spring tongues 13. As also shown individually by FIGS. 2 and 3, from the ring shoulder 31 several tongues 33 protrude which engage in the interspaces between adjacent spring tongues 13 and are bent off radially inward on the side of the releaser 3. The tongues 33 hold a wire ring 35 (FIG. 1) which in turn fixes the ring part 17 axially on the spring tongues 13.

The ring part 19, in the bringing together of engine and gear, is inserted axially into the ring part 17, with an entry taper 37, which tapers in the direction of introduction. A radially elastic wire ring 39, which can support itself on a ring shoulder 41 axially facing the presser plate 7, of the sleeve part 29, is widened out by the entry taper 37 in the insertion of the ring part 19, until it can snap in behind a ring shoulder 43 adjoining the entry taper 37 and facing axially away from the presser plate 7. Thus the wire ring 39 prevents the extraction of the ring part 19 from the ring part 17 and renders possible the transmission of traction forces in the direction of the arrow 27.

The wire ring 39 is made as an open wire ring of circular ring form which is uniformly loaded by reason of its uniform configuration and therefore has a comparatively long life. The two ring ends 45 of the wire ring 39 are cranked and on the side remote from the presser plate 7 they protrude from the ring part 17 for the formation of graspable ends. The wire ring 39 can be widened out for dismantlement by pressing apart of the graspable ends 45.

For the assembling the wire ring 39 is supported on a support ring 47 formed as sheet metal shaped part which is secured on the sleeve part 29 with a plurality of formed on retaining tabs. As shown best by FIGS. 2 and 3, the support ring 47 is guided radially on an annular face 49 which merges on the side of the releaser 3 into a shoulder 51 facing the presser plate 7. The shoulder 51 fixes the support ring 47 towards the releaser 3. In the opposite direction the support ring 47 is fixed by three retaining tabs 53, 55, 57 offset by 120° in relation to one another, which grasp through radially between the wire ring 39 and the sleeve part 29 and are bent with bending tabs 59 around the sleeve part 29 on the outside thereof. The retaining tabs 53, 55, 57 extend through apertures 65, 67, 69 through the ring shoulder 41, while the bending tabs 59, 61, 63 in turn extend in axial apertures 71, 73, 75 and abut on the bottoms of these apertures. The aperture 71 is deeper in the axial direction than the apertures 73, 75 and thus forms a radial opening through which the graspable ends 45 of the wire ring 39 can emerge. With its end faces 77 facing one another in the circumferential direction the aperture 71 forms stops which receive the graspable ends 45 of the wire ring 39 between them and thus fix the wire ring 39 non-rotatably.

The side of the support ring 47 axially adjacent to the presser plate 7 is provided with a radially inwardly protruding ring flange 79 which axially supports the wire ring 39 in the insertion of the ring part 19. In the unstressed condition the wire ring 39 has an external diameter which is slightly smaller than the internal diameter of the support ring 47. The radial play of the wire ring 39 in the support ring 47 and thus the ring part 17 would make the threading-in of the ring part 19 considerably more difficult. In order to facilitate the uniting of engine and gear, two spring tongues 81 are formed on the retaining tab 53 and a spring tongue 83 and 85 respectively is formed on each of the retaining tabs 55, 57. The spring tongues 81, 83, 85 hold the wire ring 39 centrally in relation to the sleeve part 29 and thus facilitate the introduction of the entry taper 37 into the wire ring and thus the ring part 17. The two tongues 81 hold the wire ring 39 on both sides of the graspable ends 45 in order here too to keep radial shift as slight as possible.

Figure 4:
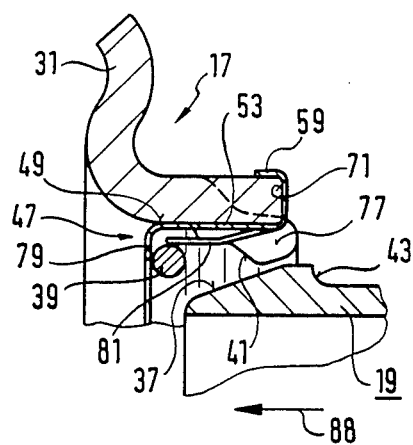
FIGS. 4 to 6 show detail elevations to explain the assembly procedure.

The operation of fitting will be explained in greater detail by reference to FIGS. 4 to 6. These Figures show the ring part 17 in an axial longitudinal section through the region of the retaining tab 53. In FIG. 4 there is represented the situation in the introduction of the ring part 19 into the ring part 17 during the uniting of engine and gear. The wire ring 39 lies on the spring tongue 81 and the ring flange 79, so that the entry taper 37 can be threaded without problem in the entry direction indicated by an arrow 88. The wire ring 39 is not radially stressed. Its external diameter in this situation is greater than the minimum diameter of the ring shoulder 41 and greater than the internal diameter of the ring flange 79.

Figure 5:
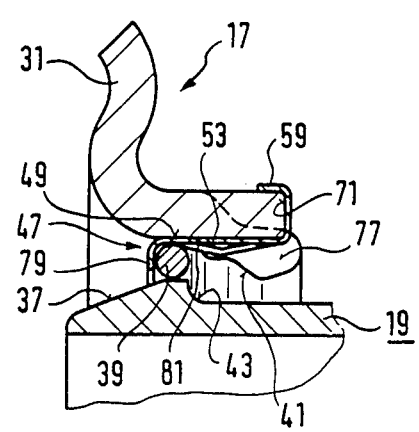
Figure 6:
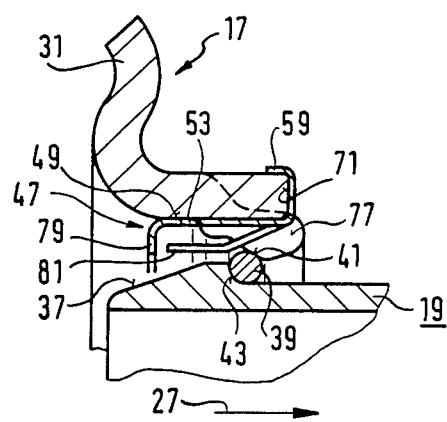
Figure 7:
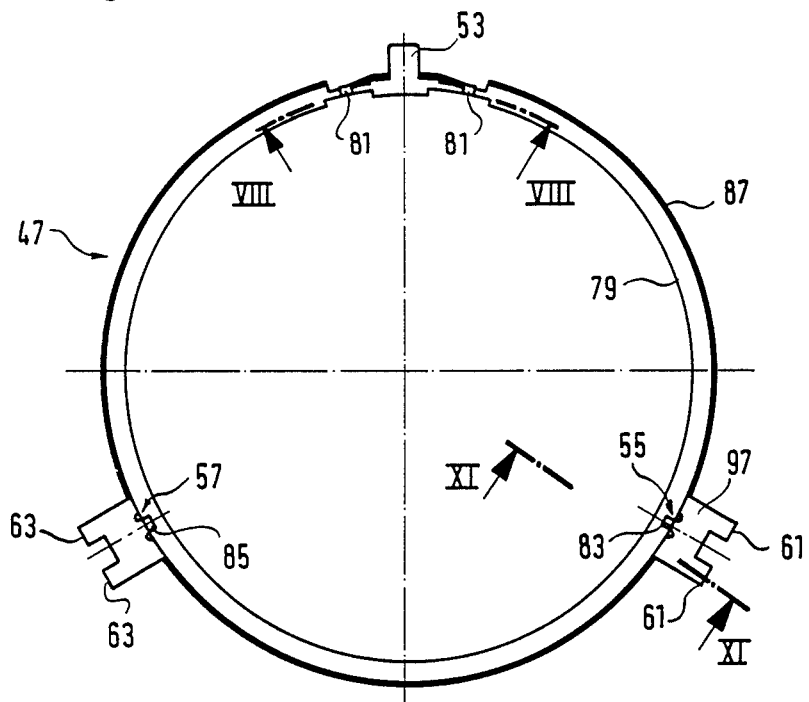
FIG. 7 shows an axial elevation of a support ring installed in the ring part of FIG. 2.

FIG. 5 shows the situation in which, by insertion of the ring part 19, the wire ring 39 is widened radially to the maximum and thus initially stressed. The ring shoulder 79 has transmitted to the ring part 17 the axial force generated in widening by the entry taper 37. FIG. 5 shows that the maximum external diameter of the entry taper 37 and the internal diameter of the support ring 47 are so dimensioned that the wire ring 39 just finds room radially between them. If the ring part 19 is pushed further in the direction of the arrow 88, then the initially stressed wire ring 39 snaps in behind the ring shoulder 43 of the ring part 19 and between the ring shoulders 41, 43 blocks the ring part 19 against extraction in the actuation direction 27 of the releaser 3. For dismantlement the wire ring 39 is widened out, by drawing apart of its graspable ends 45, so far that the ring shoulder 43 and the entry ramp 37 can be drawn out of the wire ring 39 again.

Figure 8:
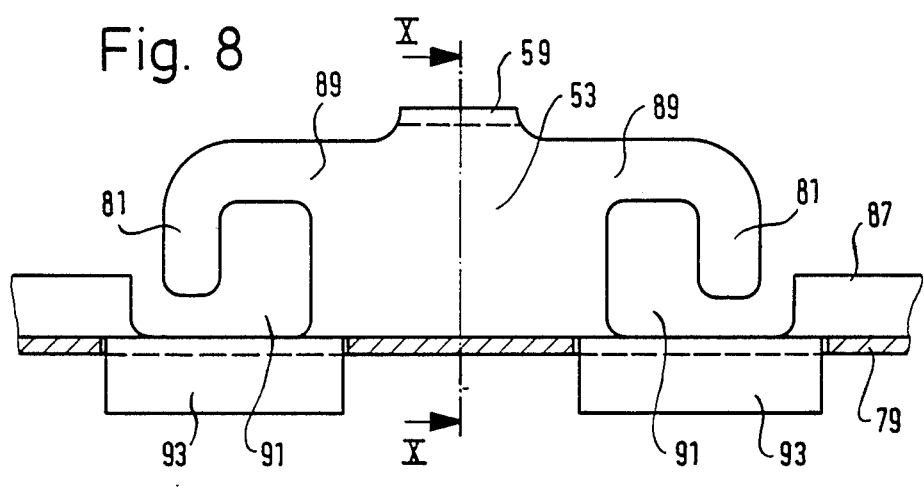
FIG. 8 shows a partial development of the support ring, seen along a line VIII—VIII in FIG. 7.
Figure 9:
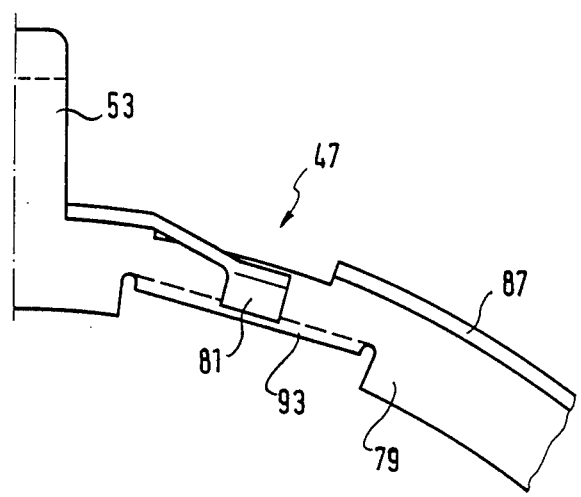
FIG. 9 shows a detail elevation of the support ring according to FIG. 7.
Figure 10:
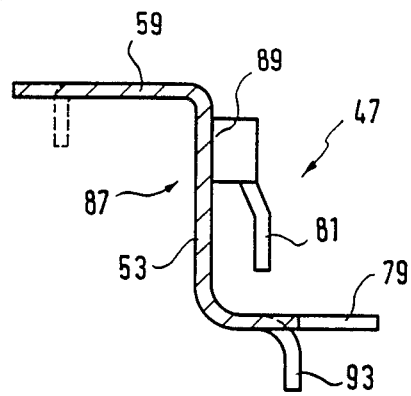
FIG. 10 shows a sectional view of the support ring seen along a line X—X in FIG. 8.
Figure 11:
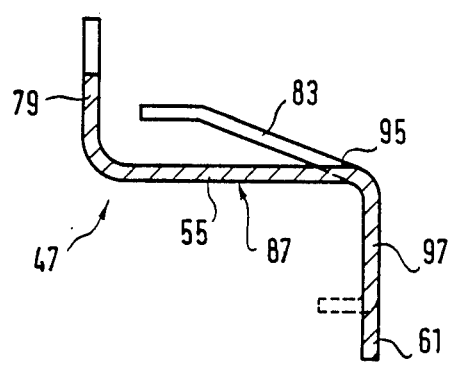
FIG. 11 shows a sectional view of the support ring, seen along a line XI—XI in FIG. 7.

FIGS. 7 to 11 show details of the support ring 47 as already explained above. The support ring 47 has a circumferential wall 87 intended for abutment on the sleeve part 29, from which wall the ring flange 79 protrudes radially inwards from one axial side. The spring tongues 81 provided for the centering of the two ends of the wire ring 39 are formed, as best shown by FIG. 8, as angle tongues which stand away from one another from circumferentially mutually opposite sides of the retaining tab 53 and are bent off towards the ring flange 79. The roots 89 of the spring tongues 81 here extend with axial spacing from the ring flange 79 and are punched by clear cuts 91 out of the material of the circumferential wall 87 in such a way that the free ends of the spring tongues 81 reach nearly to the ring flange 79. To compensate for the consequent material attentuation detrimental to the stability of the support ring tabs 93 lying radially opposite to the spring tongues are formed on the ring flange 79 and are bent off axially oppositely from the ring flange 79. The tabs 93 stiffen out the support ring 47 in this region.

The retaining tabs 55, 57 are of like configuration so that only the configuration of the retaining tab 55 will be explained as example. The spring tongue 83 is arranged in the middle plane of the retaining tab 55 while its root 95 is provided on the side axially remote from the ring flange 79 and merges into a web 97 connecting the zones of the retaining tab 55 in the circumferential direction on both sides of the spring tongue 33. The bending tabs 61 stand away from the web 97 with a spacing from one another in the circumferential direction which is greater than the width of the bending tabs 61. The support ring 47 is stiffened out in the region of the retaining tab 55 by the web 97 and its double fastening by means of the tabs 61 on the sleeve part 29.

While specific embodiments of the invention have been shown and described in detail to illustrate the application of the inventive principles, it will be understood that the invention may be embodied otherwise without departing from such principles.

What we claim is:

1. An arrangement for the snap connection of a clutch releaser in a given direction with spring tongue ends of a diaphragm spring in a diaphragm spring clutch of the pulled construction type, comprising:
   (a) a first ring part for securing on the ends of the spring tongues, which comprises a radially inwardly protruding first ring stop shoulder facing in the given direction of connection of the releaser with the spring tongue ends,
   (b) a second ring part connected with the releaser, which part comprises a radially outwardly protruding second ring stop shoulder facing in the opposite direction relative to said first ring stop shoulder and is insertable, with the second stop ring shoulder leading, through beneath the first stop ring shoulder axially into the first ring part,
   (c) a radially elastic wire ring arranged in the first ring part on the side of the first ring shoulder axially remote from the releaser, which wire ring is radially snappable over the second ring shoulder in the insertion of the second ring part into the first ring part,
   (d) a support ring inserted into the first ring part and fixed centrally on the first ring part, which support ring comprises, on its side axially remote from the releaser a third ring shoulder for the axial supporting of the wire ring, on its side axially facing the releaser a plurality of retaining tabs offset in relation to one another in the circumferential direction, which extend through between the circumference of the wire ring and the first ring part and are bent off on the side of the first ring part axially facing the releaser radially outwards in front of axial abutment faces of the first ring part,
   (e) and at least one radially elastic spring tongue on each of the retaining tabs for the central fixing of the wire ring in the first ring part before the insertion of the second ring part.

2. An arrangement according to claim 1, wherein the wire ring is formed as an open wire ring of continuously circular ring form, the ring ends of which stand away radially outwards,
   wherein at least one of the abutment faces intended for the abutment of the retaining tabs is formed by an axial aperture, limited by shoulders in the circumferential direction, in the first ring part, and
   wherein the ring ends of the wire ring emerge radially through this aperture for the securing of the wire ring against rotation.

3. An arrangement according to claim 2,
   wherein the retaining tab engaging together with the ring ends of the wire ring in the aperture of the first ring part carries two spring tongues arranged with spacing from one another in the circumferential direction, on which the wire ring rests with ring ends arranged between the two spring tongues, before the insertion of the second ring part.

4. An arrangement according to claim 2,
   wherein all retaining tabs rest on axial abutment faces formed by axial apertures and
   wherein the retaining tabs are bent radially away over the axial abutment faces on to the external peripheral surface of the first ring part.

5. An arrangement according to claim 1,
   wherein the support ring is made as a sheet metal shaped part and comprises a circumferential wall guided radially on a ring inner face of the first ring part, from which, on one axial side, a ring flange forming the third ring shoulder is bent away radially inwards and from which, on the axially opposite side, the retaining tabs protrude.

6. An arrangement according to claim 5,
   wherein the spring tongues merge with their roots at a distance from the ring flange into the retaining tabs and protrude with their free ends to the ring flange.

7. An arrangement according to claim 5,
   wherein at least one of the retaining tabs carries, on sides opposite to one another in the circumferential direction, two spring tongues of angle form which extend in the circumferential direction in the region of their tongue roots and axially in the region of their free ends.

8. An arrangement according to claim 7,
wherein the free ends of the spring tongues of angle form reach axially into punched-out apertures of the circumferential wall and
wherein the ring flange carries tabs lying radially opposite to the punched-out apertures, which are bent off axially oppositely to the circumferential wall.

9. An arrangement according to claim 5,
wherein at least one of the retaining tabs comprises only one spring tongue and
wherein on both sides, in the circumferential direction, of the tongue roots two bending tabs protrude which are bent over the axial abutment face of the first ring part on to the external circumferential face of the first ring part.

10. An arrangement according to claim 5,
wherein the first ring part comprises, at axial distance from the first ring shoulder, another ring shoulder facing in the same direction, against which the circumferential wall of the support ring rests.

11. An arrangement according to claim 1,
wherein the support ring comprises three retaining tabs offset by 120° in the circumferential direction in relation to one another, of which one is provided with two spring tongues and the two others are provided each with one spring tongue.

* * * * *